(12) United States Patent
Uehara et al.

(10) Patent No.: US 8,992,733 B2
(45) Date of Patent: Mar. 31, 2015

(54) WATER AND OIL RESISTANT AGENT FOR PAPER AND PAPER TREATMENT PROCESS

(75) Inventors: Tetsuya Uehara, Settsu (JP); Kensuke Mohara, Settsu (JP); Eiji Masuda, Settsu (JP); Kayo Kusumi, Settsu (JP); Michio Matsuda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/578,957

(22) PCT Filed: Feb. 14, 2011

(86) PCT No.: PCT/JP2011/053594
§ 371 (c)(1),
(2), (4) Date: Aug. 14, 2012

(87) PCT Pub. No.: WO2011/099650
PCT Pub. Date: Aug. 18, 2011

(65) Prior Publication Data
US 2012/0325419 A1 Dec. 27, 2012

Related U.S. Application Data

(60) Provisional application No. 61/304,621, filed on Feb. 15, 2010.

(51) Int. Cl.
*D21H 21/16* (2006.01)
*D21H 17/34* (2006.01)
*D21H 17/42* (2006.01)
*C08F 26/10* (2006.01)
*C08F 220/02* (2006.01)
*C08F 220/22* (2006.01)
*C08F 226/10* (2006.01)

(52) U.S. Cl.
CPC ............ *C08F 220/22* (2013.01); *C08F 226/10* (2013.01)
USPC .................. 162/168.7; 162/164.1; 162/164.5; 162/168.1; 526/242; 526/245; 526/248; 526/263; 526/318.4; 526/329.4

(58) Field of Classification Search
USPC ............. 162/135, 164.1, 164.5, 164.7, 168.1, 162/168.7; 526/245–255, 242, 256, 258, 526/263, 264, 303.1, 307.3–307.7, 310, 526/312, 314, 317.1, 318, 318.3, 526/318.4–318.5, 319, 320, 328, 328.5, 526/329.4–329.7, 72, 332–3
See application file for complete search history.

(56) References Cited

U.S. PATENT DOCUMENTS

| | | | |
|---|---|---|---|
| 4,366,299 A | | 12/1982 | Dessaint |
| 4,529,783 A * | | 7/1985 | Tsunoda et al. .............. 526/246 |
| 6,111,043 A | | 8/2000 | Corpart et al. |
| 6,649,719 B2 * | | 11/2003 | Moore et al. ................... 526/245 |
| 6,828,399 B2 * | | 12/2004 | Lee ............................... 526/264 |
| 2004/0026053 A1 * | | 2/2004 | Tembou N'Zudie et al. . 162/135 |
| 2005/0234205 A1 | | 10/2005 | Yamaguchi et al. |

FOREIGN PATENT DOCUMENTS

| | | |
|---|---|---|
| JP | 63-027585 | 2/1988 |
| JP | 05-345810 | 12/1993 |
| WO | 98/23657 A1 | 6/1998 |
| WO | 03/106519 A1 | 12/2003 |

OTHER PUBLICATIONS

EPA OPPT Fact Sheet, Apr. 14, 2003, (http://www.epa.gov/opptintr/pfoa/pfoafacts.pdf), 3 pages.
Federal Register, (FR vol. 68, No. 73 / Apr. 16, 2003 [FRL-2303-8]), (http://www.epa.gov/opptintr/pfoa/pfoafr.pdf), pp. 18626-18633.
EPA Environmental News, For Release: Monday Apr. 14, 2003, EPA Intensifies Scientific Investigation of a Chemical Processing Aid, (http://www.epa.gov/opptintr/pfoa/pfoaprs.pdf), 2 pages.
"Preliminary Risk Assessment of the Developmental Toxicity Associated With Exposure to Perfluorooctanoic Acid and Its Salts", Apr. 10, 2003, (http://www.epa.gov/opptintr/pfoa/pfoara.pdf), 63 pages.

* cited by examiner

*Primary Examiner* — Dennis Cordray
(74) *Attorney, Agent, or Firm* — Sughrue Mion, PLLC

(57) ABSTRACT

Disclosed is a water and oil resistant agent comprising a fluorine-containing copolymer obtained by copolymerizing a (meth)acrylate monomer having a polyfluoroalkyl group having 1 to 6 carbon atoms, the agent being able to afford a superior water and oil resistance to a paper. The invention also discloses a composition comprising the water and oil resistant agent, a process for treating a paper thereby and a treated paper thereby.

20 Claims, No Drawings

WATER AND OIL RESISTANT AGENT FOR PAPER AND PAPER TREATMENT PROCESS

CROSS REFERENCE TO RELATED APPLICATIONS

This application is a National Stage of International Application No. PCT/JP2011/053594, filed on Feb. 14, 2011, which claims priority from U.S. Patent Application No. 61/304,621, filed on Feb. 15, 2009, the contents of all of which are incorporated herein by reference in their entirety.

TECHNICAL FIELD

The present invention is related to a water and oil resistant agent for paper, a treatment process by the agent and the treated paper therewith.

BACKGROUND ART

The copolymer composition comprising a long chain $C_6$ to $C_{12}$ polyfluoroalkyl group (hereinafter called as "Rf group") has been utilized previously as the water and oil resistant agent for paper.

On the other hand, US EPA (United State Environment Protection Agency) pointed out that the long chain Rf group produces perfluoro-octanoic acid (hereinafter called as "PFOA") which might cause an influence on the environment.

Therefore, many efforts have been made to develop a water and oil resistant agent for paper by using a fluorine-containing copolymer having a short chain Rf group. The water resistance and the oil resistance, however, tend to decrease along with the decrease of the carbon number of the Rf group, and the water and oil resistance is not satisfactory. So, further improvements have to be made to provide a paper having an enough water and oil resistance.

Yamaguchi et. al. (WO2003/106519), for example, proposed a water and oil resistant agent for paper comprising a fluorine-containing copolymer which contains, as essential components, a fluorine-containing (meth)acrylate monomer having preferably a $C_4$ to $C_{16}$ Rf group, a cationic nitrogen-containing monomer such as dimethylaminoethyl methacrylate, N-vinylpyrrolidone (NVP) and an anionic monomer such as acrylic acid.

Although this paper treatment agent has a low viscosity and keeps a high performance even co-used with a cationic paper-strengthening agent, a further improvement in the water and oil resistance has been required.

Jean-Marc et. al (WO98/23657) also proposed a water and oil resistant agent for paper comprising a fluorine-containing copolymer having, as essential components, a fluorine-containing (meth)acrylate monomer preferably having a $C_4$ to $C_{16}$ Rf group, a cationic nitrogen-containing monomer such as dimethylaminoethyl methacrylate, and a vinyl derivative such as vinyl acetate, wherein the water and oil resistant agent is effected by hydrogen peroxide to improve a barrier effect toward oils and fats. Although this water and oil resistant agent has fairly improved the water and oil resistance, a further improvement is required in the durability of the oil resistance for a longer time.

DISCLOSURE OF INVENTION

Problems to be Solved by the Invention

An object of the present invention is to provide a water and oil resistant agent having a further improved water and oil resistance.

Means for Solving the Problems

We, the inventors, surprisingly discovered that a paper treatment agent comprising, as an essential component, a fluorine-containing copolymer comprising specified polymer units having a short chain Rf can exhibit a superior water and oil resistance. Thus, the present invention has been completed.

That is, the subject of the invention is to provide a water and oil resistant agent for paper comprising a fluorine-containing copolymer comprising, as essential components, the repeating units derived from:

(a) a fluorine-containing monomer having a fluoroalkyl group represented by the general formula:

$$CH_2=C(-X)-C(=O)-Y-Z-Rf \quad (1)$$

wherein X represents a hydrogen atom, a linear or branched $C_1$ to $C_{21}$ alkyl group, a fluorine atom, a chlorine atom, a bromine atom, an iodine atom, a $CFX^1X^2$ group wherein $X^1$ and $X^2$ are a hydrogen atom, a fluorine atom, a chlorine atom, a bromine atom or an iodine atom, a cyano group, a linear or branched $C_1$ to $C_{21}$ fluoroalkyl group, a substituted or non-substituted benzyl group, or a substituted or non-substituted phenyl group;
Y is —O— or —NH—;
Z is a $C_1$ to $C_{10}$ aliphatic group, a $C_6$ to $C_{10}$ aromatic or cyclic aliphatic group,
a —$CH_2CH_2N(R^1)SO_2$— group wherein $R^1$ is a $C_1$ to $C_4$ alkyl group,
a —$CH_2CH(OZ^1)$ $CH_2$— group wherein $Z^1$ is a hydrogen atom or an acetyl group,
a —$(CH_2)_m$—$SO_2$—$(CH_2)_n$— group or a —$(CH_2)_m$—S—$(CH_2)_n$— group wherein m is an integer from 1 to 10 and n is an integer from 0 to 10, and
Rf is a linear or branched $C_1$ to $C_6$ fluoroalkyl group,
(b) a vinylpyrrolidone monomer represented by the general formula:

$$(2)$$

wherein $R^{21}$, $R^{22}$, $R^{23}$, $R^{24}$, $R^{25}$ and $R^{26}$ are the same or different, and represent a hydrogen atom or a $C_1$ to $C_4$ alkyl group;
(c) a monomer having an anion-donating group, and
(d) a fluorine free (meth)acrylate monomer.

The present invention also provides a process for treating paper with the above-described water and oil resistant agent, and also provides a water and oil resistant paper obtained thereby.

Effect of the Invention

The present invention provides the water and oil resistant agent comprising a fluorine-containing copolymer, wherein the agent affords the superior water and oil resistance to the paper. The present invention also provides the process for the paper treatment by the water and oil resistant agent, and also provides the water and oil resistant paper obtained by using the water and oil resistant agent.

MODE FOR CARRYING OUT THE INVENTION

In the present invention, the composition of the fluorine-containing copolymer has a great influence on the water and oil resistance of the water and oil resistant agent. The fluorine-containing copolymer used in the present invention is explained as follows.

The fluorine-containing monomer (a) may be substituted by a halogen atom etc. at the α-position. Therefore, X in the formula (1) may be a hydrogen atom, a linear or branched $C_1$ to $C_{21}$ alkyl group, a fluorine atom, a chlorine atom, a bromine atom, an iodine atom, a $CFX^1X^2$ group wherein $X^1$ and $X^2$ are a hydrogen atom, a fluorine atom, a chlorine atom, a bromine atom or an iodine atom, a cyano group, a linear or branched $C_1$ to $C_{21}$ fluoroalkyl group, a substituted or non-substituted benzyl group, or a substituted or non-substituted phenyl group.

In the formula (1), the Rf group is preferably a perfluoroalkyl group. The carbon number of the Rf group may be 1 to 6, preferably 2 to 6, especially 4 to 6, and typically 6. The examples of the Rf group are $-CF_3$, $-CF_2CF_3$, $-CF_2CF_2CF_3$, $-CF(CF_3)_2$, $-CF_2CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $-CF(CF_3)CF_2CF_2CF_3$, $-(CF_2)_5CF_3$ and $-(CF_2)_3CF(CF_3)_2$ etc. Especially, $-(CF_2)_5CF_3$ is preferable.

Non-limiting examples of the fluorine-containing monomer (a) are exemplified as follows:

$CH_2=C(-H)-C(=O)-O-(CH_2)_2-Rf$
$CH_2=C(-H)-C(=O)-O-C_6H_4-Rf$
$CH_2=C(-Cl)-C(=O)-O-(CH_2)_2-Rf$
$CH_2=C(-H)-C(=O)-O-(CH_2)_2N(-CH_3)SO_2-Rf$
$CH_2=C(-H)-C(=O)-O-(CH_2)_2N(-C_2H_5)SO_2-Rf$
$CH_2=C(-H)-C(=O)-O-CH_2CH(-OH)CH_2-Rf$
$CH_2=C(-H)-C(=O)-O-CH_2CH(-OCOCH_3)CH_2-Rf$
$CH_2=C(-H)-C(=O)-O-(CH_2)_2-S-Rf$
$CH_2=C(-H)-C(=O)-O-(CH_2)_2-S-(CH_2)_2-Rf$
$CH_2=C(-H)-C(=O)-O-(CH_2)_3-SO_2-Rf$
$CH_2=C(-H)-C(=O)-O-(CH_2)_2-SO_2-(CH_2)_2-Rf$
$CH_2=C(-H)-C(=O)-NH-(CH_2)_2-Rf$
$CH_2=C(-CH_3)-C(=O)-O-(CH_2)_2-Rf$
$CH_2=C(-CH_3)-C(=O)-O-C_6H_4-Rf$
$CH_2=C(-CH_3)-C(=O)-O-(CH_2)_2N(-CH_3)SO_2-Rf$
$CH_2=C(-CH_3)-C(=O)-O-(CH_2)_2N(-C_2H_5)SO_2-Rf$
$CH_2=C(-CH_3)-C(=O)-O-CH_2CH(-OH)CH_2-Rf$
$CH_2=C(-CH_3)-C(=O)-O-CH_2CH(-OCOCH_3)CH_2-Rf$
$CH_2=C(-CH_3)-C(=O)-O-(CH_2)_2-S-Rf$
$CH_2=C(-CH_3)-C(=O)-O-(CH_2)_2-S-(CH_2)_2-Rf$
$CH_2=C(-CH_3)-C(=O)-O-(CH_2)_3-SO_2-Rf$
$CH_2=C(-CH_3)-C(=O)-O-(CH_2)_2-SO_2-(CH_2)_2-Rf$
$CH_2=C(-CH_3)-C(=O)-NH-(CH_2)_2-Rf$
$CH_2=C(-F)-C(=O)-O-(CH_2)_2-S-Rf$
$CH_2=C(-F)-C(=O)-O-(CH_2)_2-S-(CH_2)_2-Rf$
$CH_2=C(-F)-C(=O)-O-(CH_2)_2-SO_2-Rf$
$CH_2=C(-F)-C(=O)-O-(CH_2)_2-SO_2-(CH_2)_2-Rf$
$CH_2=C(-F)-C(=O)-NH-(CH_2)_2-Rf$
$CH_2=C(-Cl)-C(=O)-O-(CH_2)_2-S-Rf$
$CH_2=C(-Cl)-C(=O)-O-(CH_2)_2-S-(CH_2)_2-Rf$
$CH_2=C(-Cl)-C(=O)-O-(CH_2)_2-SO_2-Rf$
$CH_2=C(-Cl)-C(=O)-O-(CH_2)_2-SO_2-(CH_2)_2-Rf$
$CH_2=C(-Cl)-C(=O)-NH-(CH_2)_2-Rf$
$CH_2=C(-CF_3)-C(=O)-O-(CH_2)_2-S-Rf$
$CH_2=C(-CF_3)-C(=O)-O-(CH_2)_2-S-(CH_2)_2-Rf$
$CH_2=C(-CF_3)-C(=O)-O-(CH_2)_2-SO_2-Rf$
$CH_2=C(-CF_3)-C(=O)-O-(CH_2)_2-SO_2-(CH_2)_2-Rf$
$CH_2=C(-CF_3)-C(=O)-NH-(CH_2)_2-Rf$
$CH_2=C(-CF_2H)-C(=O)-O-(CH_2)_2-S-Rf$
$CH_2=C(-CF_2H)-C(=O)-O-(CH_2)_2-S-(CH_2)_2-Rf$
$CH_2=C(-CF_2H)-C(=O)-O-(CH_2)_2-SO_2-Rf$
$CH_2=C(-CF_2H)-C(=O)-O-(CH_2)_2-SO_2-(CH_2)_2-Rf$
$CH_2=C(-CF_2H)-C(=O)-NH-(CH_2)_2-Rf$
$CH_2=C(-CN)-C(=O)-O-(CH_2)_2-S-Rf$
$CH_2=C(-CN)-C(=O)-O-(CH_2)_2-S-(CH_2)_2-Rf$
$CH_2=C(-CN)-C(=O)-O-(CH_2)_2-SO_2-Rf$
$CH_2=C(-CN)-C(=O)-O-(CH_2)_2-SO_2-(CH_2)_2-Rf$
$CH_2=C(-CN)-C(=O)-NH-(CH_2)_2-Rf$
$CH_2=C(-CF_2CF_3)-C(=O)-O-(CH_2)_2-S-Rf$
$CH_2=C(-CF_2CF_3)-C(=O)-O-(CH_2)_2-S-(CH_2)_2-Rf$
$CH_2=C(-CF_2CF_3)-C(=O)-O-(CH_2)_2-SO_2-Rf$
$CH_2=C(-CF_2CF_3)-C(=O)-O-(CH_2)_2-SO_2-(CH_2)_2-Rf$
$CH_2=C(-CF_2CF_3)-C(=O)-NH-(CH_2)_2-Rf$
$CH_2=C(-F)-C(=O)-O-(CH_2)_3-S-Rf$
$CH_2=C(-F)-C(=O)-O-(CH_2)_3-S-(CH_2)_2-Rf$
$CH_2=C(-F)-C(=O)-O-(CH_2)_3-SO_2-Rf$
$CH_2=C(-F)-C(=O)-O-(CH_2)_3-SO_2-(CH_2)_2-R$
$CH_2=C(-F)-C(=O)-NH-(CH_2)_3-Rf$
$CH_2=C(-Cl)-C(=O)-O-(CH_2)_3-S-Rf$
$CH_2=C(-Cl)-C(=O)-O-(CH_2)_3-S-(CH_2)_2-Rf$
$CH_2=C(-Cl)-C(=O)-O-(CH_2)_3-SO_2-Rf$
$CH_2=C(-Cl)-C(=O)-O-(CH_2)_3-SO_2-(CH_2)_2-Rf$
$CH_2=C(-CF_3)-C(=O)-O-(CH_2)_3-S-Rf$
$CH_2=C(-CF_3)-C(=O)-O-(CH_2)_3-S-(CH_2)_2-Rf$
$CH_2=C(-CF_3)-C(=O)-O-(CH_2)_3-SO_2-Rf$
$CH_2=C(-CF_3)-C(=O)-O-(CH_2)_3-SO_2-(CH_2)_2-Rf$
$CH_2=C(-CF_2H)-C(=O)-O-(CH_2)_3-S-Rf$
$CH_2=C(-CF_2H)-C(=O)-O-(CH_2)_3-S-(CH_2)_2-Rf$
$CH_2=C(-CF_2H)-C(=O)-O-(CH_2)_3-SO_2-Rf$
$CH_2=C(-CF_2H)-C(=O)-O-(CH_2)_3-SO_2-(CH_2)_2-Rf$
$CH_2=C(-CN)-C(=O)-O-(CH_2)_3-S-Rf$
$CH_2=C(-CN)-C(=O)-O-(CH_2)_3-S-(CH_2)_2-Rf$
$CH_2=C(-CN)-C(=O)-O-(CH_2)_3-SO_2-Rf$
$CH_2=C(-CN)-C(=O)-O-(CH_2)_3-SO_2-(CH_2)_2-Rf$
$CH_2=C(-CF_2CF_3)-C(=O)-O-(CH_2)_3-S-Rf$
$CH_2=C(-CF_2CF_3)-C(=O)-O-(CH_2)_3-S-(CH_2)_2-Rf$
$CH_2=C(-CF_2CF_3)-C(=O)-O-(CH_2)_3-SO_2-Rf$ wherein Rf is a fluoroalkyl group of $C_1$ to $C_6$, preferably $C_4$ to $C_6$.

The fluoroalkyl group (Rf) in the fluorine-containing monomer (a) may be, preferably a perfluoroalkyl group, and most preferably a $C_4$ to $C_6$ perfluoroalkyl group. The fluorine-containing monomer (a) may be a mixture of two or more types of monomers.

The vinylpyrrolidone monomer (b) represented by the general formula (2) is a N-vinyl-2-pyrrolidone or N-vinyl-2-pyrrolidone derivative which may have $C_1$ to $C_4$ alkyl substituents, for example, a methyl group, on the ring. The monomer (b) is preferably at least one selected from the group consisting of N-vinyl-2-pyrrolidone, N-vinyl-3-methyl-2-pyrrolidone, N-vinyl-4-methyl-2-pyrrolidone, N-vinyl-5-methyl-2-pyrrolidone and N-vinyl-3,3-dimethyl-2-pyrrolidone.

The monomer (c) is a compound having an anion-donating group and a carbon-carbon double bond. The anion-donating group may be a carboxyl group or a sulfonic acid group. The monomer (c) may have 2 to 15 carbon atoms. The monomer (c) may be preferably at least one selected from the group consisting of (meth)acrylic acid, crotonic acid, maleic acid, fumaric acid, itaconic acid, citraconic acid, vinylsulfonic acid, (meth)allylsulfonic acid, styrene sulfonic acid, vinylbenzene sulfonic acid, acrylamide-tert-butylsulfonic acid, and salts thereof. The especially preferable monomer (c) is methacrylic acid or acrylic acid.

The fluorine-free (meth)acrylate monomer (d) is a (meth)acrylate monomer having no fluorine atom, and it may be at least one selected from the group consisting of oxyalkylene (meth)acrylate or oxyalkylene di(meth)acrylate represented by the general formulas:

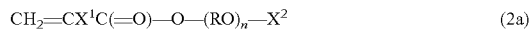

$$CH_2=CX^1C(=O)-O-(RO)_n-X^2 \quad (2a)$$

and

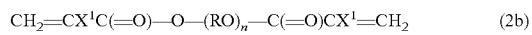

$$CH_2=CX^1C(=O)-O-(RO)_n-C(=O)CX^1=CH_2 \quad (2b)$$

wherein $X^1$ is a hydrogen atom or a methyl group,
$X^2$ is a hydrogen atom or a saturated or unsaturated $C_1$ to $C_{22}$ hydrocarbon group,
R is a $C_2$ to $C_6$ alkylene group, and
n is an integer from 1 to 90.

The other example of fluorine-free monomer (d) may be a (meth)acrylate ester having an alkyl group. The number of carbon atoms of the alkyl group may be from 1 to 30. For example, the (meth)acrylate ester monomer may be (meth)acrylate of the general formula:

$$CH_2=CA^1COOA^2$$

wherein $A^1$ is a hydrogen atom or a methyl group, and $A^2$ is an alkyl group represented by $C_nH_{2n+1}$ (n=1 to 30). The examples thereof are methyl (meth)acrylate, n-butyl (meth)acrylate, t-butyl (meth)acrylate, 2-ethylhexyl (meth)acrylate, lauryl (meth)acrylate, stearyl (meth)acrylate and behenyl (meth)acrylate.

The another example of the fluorine-free monomer (d) may be a (di)(meth)acrylate ester having an hydroxyalkyl group. The number of carbon atoms of the hydroxyalkyl group may be from 1 to 30. The examples thereof are trimethylolpropane di(meth)acrylate and pentaerythritol (meth)acrylate.

Preferably, the monomer (d) may be oxyalkylene (meth)acrylate represented by the general formula (2a) wherein $X^2$ is a hydrogen atom, R is a saturated $C_2$ to $C_6$, preferably $C_2$ hydrocarbon group, and the average number (n) of the oxyalkylene group is 10 or less, for example, 1. More specifically, the monomer (d) may be one or a mixture of 2-hydroxyethyl methacrylate and ω-hydroxy-polyoxyethylene acrylate wherein the average polymerization degree (n) of the polyoxyethylene group is 2 to 10. BLEMMER® AE-200 (n=4.5) produced by NOF Corporation is mentioned as an example of ω-hydroxy-polyoxyethylene acrylate.

The monomer (d) may be one or a mixture of 2-hydroxypropyl (meth)acrylate and 4-hydroxybutyl (meth)acrylate.

The weight ratios among the monomers (a), (b), (c) and (d) in the fluorine-containing copolymer may be (a):(b):(c):(d)=40-90:1-30:1-30:1-40% by weight based on the weight of total of monomers constituting the fluorine-containing copolymer.

Preferably, the weight ratios of (a):(b):(c):(d) may be 45-85: 1-20:1-20:1-30% by weight. More preferably, the weight ratios of (a):(b):(c):(d) may be 60-85: 1-15:1-15: 1-25% by weight.

In the present invention, there is no limitation on the molecular weight of the fluorine-containing copolymer. Considering the water and oil resistance properties and the viscosity of the paper treatment agent, the weight-average molecular weight (in terms of polystyrene) measured by GPC (gel permeation chromatography) is generally 3,000 or more, and preferably, in the range of 5,000 to 1,000,000.

The preferable embodiments of the fluorine-containing copolymer in the present invention are shown as follows. As one example of the preferable embodiments of the composition of the fluorine-containing copolymer, the monomer (a) represented by the general formula (1) is at least one fluorine-containing monomer wherein Rf represents a $C_4$ to $C_6$ perfluoroalkyl group, the monomer (b) is at least one selected from the group consisting of N-vinyl-2-pyrrolidone, N-vinyl-3-methyl-2-pyrrolidone, N-vinyl-4-methyl-2-pyrrolidone, N-vinyl-5-methyl-2-pyrrolidone and N-vinyl-3,3-dimethyl-2-pyrrolidone, the monomer (c) is at least one selected from the group consisting of (meth)acrylic acid, crotonic acid, maleic acid, fumaric acid, itaconic acid and citraconic acid, and the monomer (d) is at least one selected from the group consisting of oxyalkylene (meth)acrylates represented by the general formula (2a) wherein n is 10 or less, $X^2$ is a hydrogen atom, and R is a saturated $C_2$ hydrocarbon group.

Specifically is exemplified the embodiment wherein the fluorine-containing monomer (a) is $F(CF_2)_4CH_2CH_2OCOCH=CH_2$ or $F(CF_2)_6CH_2CH_2OCOCH=CH_2$ or a mixture thereof, the monomer (b) is N-vinyl-2-pyrrolidone, the monomer (c) is methacrylic acid or acrylic acid, and the monomer (d) is 2-hydroxyethyl methacrylate or ω-hydroxy-polyoxyethylene acrylate (wherein an average polymerization degree (n) of the polyoxyethylene group is 2 to 10) or a mixture thereof.

Further specifically is exemplified the embodiment wherein the monomer (a) is $F(CF_2)_4CH_2CH_2OCOCH=CH_2$ or $F(CF_2)_6CH_2CH_2OCOCH=CH_2$ or a mixture thereof, the monomer (b) is N-vinyl-2-pyrrolidone, the monomer (c) is acrylic acid and the monomer (d) is 2-hydroxyethyl methacrylate or ω-hydroxy-polyoxyethylene acrylate (wherein an average polymerization degree (n) of the polyoxyethylene group is 2 to 10) or a mixture thereof, and the weight ratios of (a):(b):(c):(d) are 60-85: 1-15:1-15: 1-25.

A preferable embodiment of the combination of the monomers (a) to (d) may be as follows:
the monomer (a) is at least one fluorine-containing monomer wherein Rf in the general formula (1) represents a $C_4$ to $C_6$ perfluoroalkyl group,
the monomer (b) is at least one selected from the group consisting of N-vinyl-2-pyrrolidone, N-vinyl-3-methyl-2-pyrrolidone, N-vinyl-4-methyl-2-pyrrolidone, N-vinyl-5-methyl-2-pyrrolidone and N-vinyl-3,3-dimethyl-2-pyrrolidone,
the monomer (c) is at least one selected from the group consisting of (meth)acrylic acid, crotonic acid, maleic acid, fumaric acid, itaconic acid and citraconic acid, and the monomer (d) is at least one selected from the group consisting of 2-hydroxyethyl (meth)acrylate, ω-hydroxy-polyoxyethylene acrylate wherein an average polymerization degree (n) of the polyoxyethylene group is 2 to 10, 2-hydroxypropyl (meth) acrylate, 4-hydroxybutyl (meth)acrylate, methyl (meth)acrylate, n-butyl (meth)acrylate and t-butyl (meth)acrylate.

Other preferable embodiment of the combination of the monomers (a) to (d) may be as follows:
the monomer (a) is $F(CF_2)_4CH_2CH_2OCOCH\!=\!CH_2$, $F(CF_2)_6CH_2CH_2OCOCH\!=\!CH_2$ or a mixture thereof,
the monomer (b) is N-vinyl-2-pyrrolidone,
the monomer (c) is methacrylic acid or acrylic acid, and
the monomer (d) is either of 2-hydroxyethyl (meth)acrylate or ω-hydroxy-polyoxyethylene acrylate wherein an average polymerization degree (n) of the polyoxyethylene group is 2 to 10 or a mixture thereof.

The fluorine-containing copolymer of the present invention may be any of a "solvent type" homogeneously dissolved in a solvent or a "water-dispersion type" dispersed in water. As to the water-dispersion type, the copolymer may be dispersed in water in a salt form of the polymer prepared by neutralization or may be emulsified in water by using an emulsifier. Since the fluorine-containing copolymer of the present invention contains a monomer having an anion-donating group such as a carboxyl group or sulfonic acid group, it can be neutralized by alkali resulting in the "water-dispersion type" of a salt form. Therefore, the amount of a volatile solvent can be reduced or eliminated to eventually afford an environmentally-benign water and oil resistant agent for paper.

The present invention also provides a process for treating paper to be water and oil-resistant, wherein the process comprises a step of applying the water and oil resistant agent of the present invention to the whole paper including internal parts of the paper. This treatment process is hereinafter called as an "internal application process". In this process, the water and oil resistant agent of the present invention comprising a fluorine-containing copolymer is applied to a pulp at a papermaking stage. Specifically, it is preferable to apply the water and oil resistant agent in an amount that the ratio of the fluorine atoms is, for example, 0.01 to 1.0% by weight based on the weight of the pulp.

The present invention also relates to a process for treating paper to be water and oil-resistant, wherein the process comprises a step of applying the water and oil resistant agent of the present invention to a surface of the paper. This treatment process is hereinafter called as a "surface application process" (or "external application process". In this process, it is preferable to apply the water and oil resistant agent comprising a fluorine-containing copolymer in an amount that the ratio of the fluorine atoms is, for example, 0.005 to 0.6% by weight based on the weight of the paper.

The water and oil resistant agent for paper of the present invention can be used in either of the surface application process or the internal application process. The internal application process in which the paper treatment agent is applied to the whole parts of the paper including internal parts is preferable since the internal application process provides a good compatibility of the water and oil resistant agent with the pulp, and thus the process can suppress the decrease of the water and oil resistance by a crease or a corrugation of the paper. On the other hand, the surface application process has a wide applicability, since, in the surface application process, (i) the water and oil resistant agent is applied to a nearby area around the surface of the paper and thus effectively improves the water and oil resistance around the surface by the fluorine-containing copolymer, (ii) the process does not need much water in the treatment step thus reducing the amount of a waste water, and (iii) the process is simple.

The present invention also provides a paper treatment composition comprising the water and oil resistant agent of the present invention. The paper treatment composition may comprise, in addition to the water and oil resistant agent for paper, an additive, for example, a sizing agent, a paper strengthening agent, a retention aid, a dyestuff, a fluorescent dyestuff, a filler, a slime-controlling agent, an anti-slipping agent and a deformer.

The present invention also provides a water and oil resistant paper treated with the water and oil resistant agent of the present invention.

The present invention also provides a paper obtained by the internal application process or the surface application process.

The production of the fluorine-containing copolymer of the present invention can be carried out by polymerizing monomers (a), (b), (c) and (d) in a liquid medium. The liquid medium is preferably water soluble or water dispersible solvent. The liquid medium may be a mixture comprising the water soluble or water dispersible solvent.

The monomer and the liquid medium preferably are in a form of a solution wherein the monomer is dissolved or dispersed in the liquid medium. The polymerization may be a solution polymerization or an emulsion polymerization, preferably a solution polymerization in view of stability of polymerization reaction.

In this invention, the monomer (c) (an anion donating group) may be neutralized with a base (such as an aqueous solution of inorganic or organic base) after carrying out the copolymerization; or the copolymerization may be carried out using the monomer (c) neutralized with the base in advance. When the monomers are polymerized after the monomer (c) is neutralized with the base in advance, the neutralization with a basic aqueous solution after copolymerization is not necessary (or may not be carried out).

As the inorganic or organic bases, the followings are exemplified:
sodium hydroxide, potassium hydroxide, ammonia, triethylamine, tri-n-propylamine, triisopropylamine, tri-n-butylamine, tri-sec-butylamine, ethanolamine, diethanolamine, triethanolamine, 2-amino-2-methyl-1-propanol, 2-aminomethyl-1,3-propanediol, 2-amino-2-hydroxymethyl-1,3-propanediol, bis(hydroxymethyl)methylaminomethane, tris (hydroxymethyl)aminomethane, lysine, and arginine, etc. Among these bases, sodium hydroxide, potassium hydroxide, ammonia, triethylamine, diethanolamine and triethenolamine etc. are preferable from the view point of the improvement of the dispersing stability of the obtained fluorine-containing copolymer in water or the aqueous medium.

The polymer mixture after copolymerization may be, if necessary, diluted by adding the liquid medium (for example, water or an aqueous solution containing inorganic or organic bases).

As non-limiting examples of the water-soluble or water-dispersible organic solvents utilized in copolymerization, the followings are exemplified: ketones (for example, acetone or methyl ethyl ketone), alcohols (for example, methanol, ethanol and isopropanol), ethers (for example, methyl or ethyl ether of ethylene glycol or propylene glycol, acetate ester thereof, tetrahydrofuran and dioxane), acetonitrile, dimethylformamide, N-methyl-2-pyrrolidone, butyllactone and dimethylsulfoxide, etc. Among them, methyl ethyl ketone (MEK), N-methyl-2-pyrollidone (NMP), a mixture of N-methyl-2-pyrrolidone and acetone, isopropanol or methanol is preferable as a solvent. The total monomer concentration in the solution may be in the range of 20 to 70% by weight, preferably, 40 to 60% by weight.

The copolymerization may be carried out using at least one initiator in the range of 0.1-3.0% by weight based on the total weight of the monomers. The following initiators may be used: peroxides such as benzoyl peroxide, lauroyl peroxide, succinyl peroxide and tert-butyl perpivalate, or azo-compounds such as 2,2-azobis-isobutylonitrile, 4,4-azobis (4-cyanopentanoic acid) and azodicarbonamide.

A chain transfer agent may be used for controlling the molecular weight of the copolymer. As the chain transfer agent, alkylmercaptan (dodecylmercaptan, laurylmercaptan, stearylmercaptan, etc.), aminoethanethiol, mercaptoethanol, thioglycollic acid, and 2-mercaptopropionic acid etc. are preferably exemplified. The amount of the chain transfer agent used may be in a range of 0.001 to 5, for example, 0.01 to 5 parts by weight, preferably 0.01 to 2 parts by weight based on 100 parts by weight of the total monomers in the copolymerization.

The copolymerization can be carried out generally in the range from 40° C. to the boiling point of the reaction mixture.

The dilution step may be carried out by adding a liquid medium, for example, water or an aqueous solution of a strong or moderate inorganic or organic base into the organic solution of fluorine-containing copolymer in organic solvent. The above described bases are exemplified as such a base usable for the dilution step. Among them, sodium hydroxide or ammonia is preferably used. The amount of the aqueous solution and the concentration of the base are preferable to be sufficiently enough firstly to neutralize the carboxylic acid group or the sulfonic acid group and to obtain a stable aqueous dispersion. In order to neutralize the carboxylic acid group and the sulfonic acid group, it is advantageous to use the amount of base in the range of 0.05 to 5 eq., preferably 0.1 to 3 eq. based on the monomer (c).

The final solid content of the fluorine-containing copolymer solution after dilution can take a wide range. For example, a range of 5 to 35% by weight, preferably 10 to 25% by weight can be selected.

The paper to which the water and oil resistant agent comprising the fluorine-containing copolymer of the present invention is to be applied can be produced by the conventional paper making method. Both processes may be used: the internal application process wherein the treating agent is added to the pulp slurry before paper making, and the surface application process wherein the treating agent is applied to the paper after paper making.

In case of applying the water and oil resistant agent of the present invention to the whole of paper including internal parts of the paper (the internal application process), it is preferable to use the water and oil resistant agent in such an amount that the weight ratio of the fluorine atoms is in the range of 0.01 to 1.0% by weight, especially, 0.02 to 0.6% by weight based on the weight of the pulp. On the other hand, when the water and oil resistant agent is applied to the surface of the paper (the surface application process), it is preferable to use the water and oil resistant agent in such amount that the weight ratio of the fluorine atoms is in the range of 0.005 to 0.6% by weight, for example, 0.01 to 0.4% by weight based on the weight of the paper.

The paper substrate thus treated exhibits a superior water and oil resistance generally after heat treatment at room temperature or at high temperature, or if necessary depending on the nature of the paper substrate, by accompanying a heat treatment which can be at a higher temperature range of 70° C. or more.

The paper substrate treated with the process of the present invention is exemplified as follows: a raw paper for plaster board, a coated raw paper, a wood-containing paper, a general liner and a flute, a neutral white role paper, a neutral liner, an anti-corrosion liner, a paper combined with metal and a kraft paper, etc. The following paper substrate are further exemplified: a neutral paper for printing and writing, a neutral coated raw paper, a neutral paper for PPC, a neutral heat-sensitive paper, a neutral pressure-sensitive paper, a neutral paper for ink-jet, and a neutral paper for information industry. Other papers such as a mold paper formed by molding, especially, a molded paper vessel, are exemplified. A pulp-molded vessel can be produced by the process described in the JP9-183429A.

The following materials can be utilized as a starting pulp materials for paper: a bleached or unbleached chemical pulp such as a kraft pulp or a sulfite pulp, a bleached or unbleached high-yield pulp such as a grand pulp, a mechanical pulp or a thermo-mechanical pulp, and a waste pulp such as a waste paper of newspaper, magazine, cardboard or delinked paper, non-wood pulp such as bagasse pulp, kenaf pulp or bamboo pulp. The mixtures may be also utilized between the pulp materials above mentioned and any one of synthetic fibers such as polyamide, polyimide, polyester, polyolefin and polyvinylalcohol.

When the surface application process and the internal application process are applied, a size agent, in addition to the water and oil resistant agent, can be added optionally to improve the water resistance of the paper. The examples of the size agent are a cationic size agent, an anionic size agent and a rosin size agent (for example, an acidic rosin size agent, a neutral rosin size agent). Among them, a styrene-acrylic acid copolymer, alkenylsuccinic anhydride and an alkylketene dimer are preferable. The amount of the size agent may be 0.001 to 5% by weight based on the amount of the pulp.

If necessary, other agents generally added to the paper treatment agent may be used: a paper strengthening agent such as starch, various modified starch, caroboxymethyl-cellulose, polyamidepolyamine-epichlorohydrin (PAE), polydiallyldimethylammonium chloride (poly-DADMAC) and polyacrylamide (PAM) etc., a retention aid, a dyestuff, a fluorescent dyestuff, a filler, a slime-controlling agent, an anti-slipping agent, a deformer, etc.

In the surface application process, the paper treatment agents can be applied to the paper by means of a size press, coating (a gate roll coater, a bill blade coater and a bar coater, etc.) and a spray apparatus.

EXAMPLES

The followings are examples which specifically explain the present invention. These examples are for the explanation of the present invention, but do not limit the present invention. The terms "parts" and "%" read, if not specified, "parts by weight (or pbw)" and "% by weight (or wt %)", respectively.

The testing methods used are as follows:

"Stability Test"

The stability of the dispersion of fluorine-containing copolymer in water (an aqueous dispersion) was observed as follows: The aqueous dispersion having a solid content being adjusted to 20% by weight was left standing for seven days at room temperature, and the dispersion state was visually observed by eyes whether a sedimentation or a coagulation occurred or not. The evaluation was summarized as follows: "Good" stands for absence of sedimentation or coagulation; "Fair" stands for fractional sedimentation or aggregation; "Poor" stands for large sedimentation or coagulation.

"Water Resistance Test: Cobb Test (JIS P8140)"

The test consists of measuring the weight (g) of the water absorbed in one minute by the paper having 100 cm² area and supporting 1 cm height of water, and converting the measured value in terms of a weight per 1 m² (g/m²).

"Oil Resistance Test (Kit Test)"

The oil resistance was measured according to the TAPPI T-559 cm-02 method. The test oil shown in Table 1 was placed on the paper, then, after 15 seconds, the infiltration state of the oil was observed. The maximum point of an oil resistance given by the oil having no infiltration was assigned to be an oil resistance of the paper.

TABLE 1

Relations between test oil and oil resistance
Table 1

| Degree of oil resistance | Caster oil | Toluene | n-Heptane |
|---|---|---|---|
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

"AGR (Aggressive-Grease Resistance) Test"

This test is particularly useful to verify the anti-grease paper suitability for the pet-food packaging. Briefly, this test implies the contact in standardized conditions between the pet-food and the paper specimen to be tested.

The pet-food with the trademark Sciencediet (produced by Hill's corp.) was used as the pet-food for testing. The pet-food is finely milled in a mixer. An anti-grease paper specimen, having 10×10 cm sizes, is cut out to be tested, and placed over a coated paper sheet on which a grid of 100 small squares is printed, having a surface exactly equal to that of specimen to be tested.

Before fitting the position on the grid, the specimen is slightly creased. First of all, the specimen is folded back along the line connecting the centers of the facing two edges, and the crease is reinforced by a proper roll (weight: 2450+110 g; diameter: 8 cm; width: 7 cm) covered with a hard rubber layer with 0.6 cm thickness and having a controlled hardness. The roll speed is 50-60 cm/sec. during the creasing.

The specimen is subjected to a first crease made along a line connecting centers of opposite edges of the specimen, and a second crease is made by creasing the paper along a line connecting centers of other opposite edges of the specimen. The specimen with the creases is transferred on the grid so that the specimen wholly covers the grid surface. A metal ring having a diameter of 7.2 cm and a height of 2.5 cm is placed in the middle of the paper specimen to be tested.

Then 36 g of milled pet-food are taken, which are homogeneously paced inside the ring on the paper specimen to be tested. A weight equal to 1.5 kg, cylinder-shaped, is then placed on the milled pet-food applied to the paper specimen.

The whole is put in a stove at 60° C. and 50% humidity for 24 hours. This time elapsed, the weight and the pet-food are removed and the specimen surface is tested to find fat stains, which would witness the occurred fat penetration. The test result is expressed in terms of percentage of stained surface. The lower value indicates the lower exuding and better resistance. To have a significant result, the test is carried out on at least 4 specimens subjected to the same treatment and the final result is the average of the 4 tests.

"RP-2 Test"

This test is mainly utilized to verify the adequacy of the oil resistant paper for the pet-food packaging.

An anti-grease paper specimen, having a size of 10 cm×10 cm, is cut out to be tested, and placed over a coated paper sheet, on which a grid of 100 small squares is printed, having a surface exactly equal to that of specimen to be tested.

Before fitting the position on the grid, the specimen is slightly creased. First of all, the specimen is folded back along the line connecting the centers of the facing two edges, and the crease is reinforced by a proper roll (weight: 2450±110 g; diameter: 8 cm; width: 7 cm) covered with a hard rubber layer having 0.6 cm thickness and having a controlled hardness. The roll speed is 50-60 cm/sec. during the creasing.

The specimen is subjected to a first crease made along a line connecting centers of opposite edges of the specimen, and a second crease is made by creasing the paper along a line connecting centers of other opposite edges of the specimen. The specimen with the creases is transferred on the grid so that the specimen wholly covers the grid surface.

A plastic pipe (height: 2.5 cm, internal diameter: 2.5 cm) is placed in the middle of the specimen, then 5 g of sand (Sohma standard sand: 500-850 μm) are poured into the pipe. The pipe is then removed so as to form a sand cone in the middle of the specimen. Then 1.3 ml of a specific synthetic oil produced by Ralston Purina which contains a red dye are added to the sand cone to leak into the cone.

The specimens with the sand are then kept in a stove at 60° C. and 50% of relative humidity for 24 hours. At the end, the sand mound penetrated with the oil is removed, and the underlying grid surface of the coat paper stained by the colored oil is evaluated. The RP-2 test result is then expressed as number of stained small squares, which expresses also the % of the stained squares of the grid. The lower value indicates the lower exuding and better oil resistance. In order to obtain a result of significance, the final value is the average of the results obtained on at least 4 specimens of the same sample.

Synthesis Example 1

Hundred (100) parts by weight of methyl ethyl ketone (MEK) as a solvent was introduced into a 300 ml reaction vessel equipped with a stirrer, a thermometer, a refluxing condenser, a dropping funnel, a nitrogen gas inlet and a heater. Then, with stirring, a monomer consisting of 72 parts of $F(CF_2)_6CH_2CH_2OCOCH=CH_2$ (hereinafter called as "C6FA"), 8 parts of N-vinyl-2-pyrrolidone (NVP), 15 parts of 2-hydroxyethyl methacrylate (HEMA) and 5 parts of acrylic acid (AA), and an initiator, tert-butyl perpivalate (1 part), were added in these sequences to obtain a mixture, which was further stirred for 12 hrs. under the nitrogen atmosphere at 60° C. to complete the copolymerization and cooled to the room temperature, thereby giving a solution (S1) of the fluorine-containing copolymer. The solid concentration of the obtained solution (S1) containing the copolymer was 50% by weight.

Synthesis Example 2

The copolymerization was carried out in the same procedure as in Synthesis Example 1 except that laurylmercaptane (L-SH) in 0.03 parts was additionally charged as the chain transfer agent to a monomer (total 100 parts) consisting of 72 parts of $F(CF_2)_6CH_2CH_2OCOCH=CH_2$ ("C6FA"), 8 parts of N-vinyl-2-pyrrolidone (NVP), 15 parts of 2-hydroxyethyl methacrylate (HEMA) and 5 parts of acrylic acid (AA), and 1 part of the initiator, tert-butylperpivalate, were added in these sequences to give a solution (S2) containing the fluorine-containing copolymer.

Synthesis Example 3

The copolymerization was carried out in the same procedure as in Synthesis Example 1 except that 72 parts of $F(CF_2)_6CH_2CH_2OCOCH=CH_2$ ("C6FA"), 8 parts of N-vinyl-2-pyrrolidone (NVP), 10 parts of 2-hydroxyethyl methacrylate (HEMA), 8 parts of acrylic acid (AA), 2 parts of ω-hydroxypolyoxyethylene acrylate (BLEMMER® AE-200 produced by NOF Corporation: the average polymerization degree of the polyoxyethylene group=4.5) and 1 part of the initiator, tert-butylperpivalate, were added in these sequences to give a solution (S3) containing the fluorine-containing copolymer.

Comparative Synthesis Example 1

The copolymerization was carried out in the same procedure as in Synthesis Example 1 except that, instead of N-vinyl-2-pyrrolidone (NVP) (8 parts), ω-hydroxy-polyoxyethylene acrylate (BLEMMER® AE-200 produced by NOF Corporation: the average polymerization degree of the polyoxyethylene group=4.5) (8 parts) was used to give a solution (R1) containing the fluorine-containing copolymer.

Comparative Synthesis Example 2

The copolymerization was carried out in the same procedure as in Synthesis Example 1 except that, instead of the monomer composition of Example 1, a monomer (total: 100 parts) consisting of 77 parts of $F(CF_2)_8CH_2CH_2OCOCH=CH_2$ ("C8FA"), 8 parts of N-vinyl-2-pyrrolidone (NVP), 5 parts of 2-hydroxyethyl methacrylate (HEMA) and 10 parts of dimethylaminoethyl methacrylate (DMAEMA) were used to give a solution (R2) containing the fluorine-containing copolymer.

Comparative Synthesis Example 3

The copolymerization was carried out in the same procedure as in Synthesis Example 1 except that, instead of 15 parts of 2-hydroxyethyl methacrylate (HEMA) and 5 parts of acrylic acid (AA), 10 parts of 2-hydroxyethyl methacrylate (HEMA) and 10 parts of dimethylaminoethyl methacrylate (DMAEMA) were used to give a solution (R3) containing the fluorine-containing copolymer.

Comparative Synthesis Example 4

The copolymerization was carried out in the same procedure as in Synthesis Example 1 except that, instead of 15 parts of 2-hydroxyethyl methacrylate (HEMA) and 5 parts of acrylic acid (AA), 12 parts of dimethylaminoethyl methacrylate (DMAEMA) and 8 parts of AA were used to give a solution (R4) containing the fluorine-containing copolymer.

Preparation Example 1

A pale yellow aqueous dispersion containing fluorine-containing copolymer (the content of the volatile organic solvent being less than 1% by weight) was obtained by the following sequential procedures: Adding 4.9 g of a 10% aqueous sodium hydroxide solution as a base and 90 g of an ion-exchanged water to the solution (S1: 50 g) containing the fluorine-containing copolymer obtained in Synthesis Example 1, preparation of an emulsified dispersion and evaporating MEK under reduced pressure by heating. To this aqueous dispersion is further added the ion-exchanged water to obtain an aqueous dispersion (SD1) having a solid content of 20% by weight. The dispersion stability of the SD1 obtained was evaluated in the above described method, and the obtained results are shown in Table 3.

Preparation Examples 2 and 3

Using the solutions (S2 and S3) obtained in Synthesis Examples 2 and 3, the same procedures as in Preparation Example 1 were carried out except that 4.9 g of an aqueous 10 wt % sodium hydroxide solution as a base and 90 g of water were used, to give aqueous colorless transparent dispersions (SD2 and SD3) having a solid content of 20 wt %. The dispersion stability of the SD2 and SD3 was measured, and the obtained results are shown in Table 3.

Comparative Preparation Example 1

Using the solution (R1) obtained in Comparative Synthesis Example 1, the same procedures as in Preparation Example 1 were carried out, to give an aqueous dispersion (RD1) having a solid content of 20% by weight. The dispersion stability of the RD1 was measured, and the obtained results are shown in Table 3.

Comparative Preparation Examples 2-4

Using the solutions (each of R2-R4: 50 g) obtained in Comparative Synthesis Examples 2-4, the same procedure as in Comparative Preparation Example 1 was carried out except that 0.4 g of acetic acid and 90 g of ion-exchanged water were used as the acid, to give aqueous pale yellow dispersions (RD2-RD4) having a solid content of 20% by weight. The dispersion stability of the RD2-RD4 was measured, and the obtained results are shown in Table 3.

Example 1

Evaluation in the Internal Application Process

An aqueous dispersion (875 g) containing a 0.5 wt % mixture of 40 parts of a beaten LBKP (Leaf Bleached Kraft Pulp) and 60 parts of a beaten NBKP (Needle Bleached Kraft Pulp) having a freeness of 450 ml (Canadian Standard Freeness) was introduced with stirring into the flask, then, 3.1 g of an aqueous solution containing 1 wt % of the cationic starch (SB GUM-POSIT300 produced by SANGUAN WONGSE IND. CO., LTD) was added and the stirring was continued for 1 minute, then 1.3 g of an aqueous solution containing 1 wt % of polyamidoamine-epichlorohydrin (WS-4020 produced by Japan PMC Co., Ltd., a paper strengthening agent in wet condition) was added and the stirring was continued for 1 minute, then 1.3 g of the diluted aqueous dispersion (SD1) containing 1 wt % of the fluorine-containing copolymer was added and the stirring was continued for 1 minute.

The resultant pulp slurry was made into paper with a standard hand papermaking machine described in JIS P8222 (The hand papermaking machine was modified to give a paper having a size of 25 cm×25 cm).

The resultant wet paper was pressed between filter paper sheets under a pressure of 3.5 kg/cm$^2$ so as to sufficiently absorb water contained in the wet paper. The wet paper was dried over a drum drier (115° C.×70 seconds) to obtain a water and oil resistant paper.

The basis weight of the resultant paper was 70 g/m². The water resistance (Cobb value) of this hand sheet paper was 25 g/m², and the oil resistance (Kit value) was 7, and the oil resistance (AGR value) was 0% and the oil resistance (RP-2 value) was 0%.

Examples 2 and 3

Evaluation in the Internal Application Process

The same procedures as in Example 1 were carried out except that the aqueous dispersions (SD2 and SD3) containing the fluorine-containing copolymer were used instead of the aqueous dispersion (SD1) containing the fluorine-containing copolymer in the Example 1. The water resistance and the oil resistance of the obtained water and oil resistant papers were evaluated, and the results are shown in Table 2.

Comparative Examples 1-4

Evaluation in the Internal Application Process)

The same procedures as in Example 1 were carried out except that the aqueous dispersions (RD1-RD4) containing the fluorine-containing copolymer were used instead of the aqueous dispersion (SD1) containing the fluorine-containing copolymer in Example 1. The water resistance and the oil resistance of the obtained water and oil resistant papers were evaluated, and the results are shown in Table 2.

U.S.A. The production process is shown below. The types of pulp used were LBKP (Leaf Bleached Kraft Pulp) and NBKP (Needle Bleached Kraft Pulp), and their ratio was 6/4 (L/N) and the freeness of the pulp was 400 ml (Canadian Standard Freeness).

In a slurry of the pulp having a concentration of about 2%, a cationized starch Stayloc 400 (produced by Tate and Lyle) was added in 2 wt % based on the dried pulp weight, and further a size agent Hercon 70 (produced by Hercules corp.) was added in 0.0375 wt % based on the dried pulp weight. A paper was produced from the pulp slurry by using a fourdrinire machine. The basis weight of the paper obtained was 60 g/m² and the thickness was 0.01 mm. The water resistance (Cobb value) was 80, and the oil resistance (Kit value) was 0.

The water and oil resistant paper (treated paper) was produced in the procedure described below using, as an water and oil resistant agent, the aqueous dispersion solution (SD1) containing the fluorine-containing copolymer obtained in Preparation Example 1.

An aqueous starch solution was prepared by dissolving ethylated starch PenfordGum 290 (produced by Penford Products corp.) in a hot water of 80° C. or more for 30 minutes. The aqueous dispersion solution (SD1) containing the fluorine-containing copolymer obtained in Preparation Example 1 was diluted so that the solid content of the aqueous starch solution was 1.5 wt % and the solid content of the aqueous dispersion (SD1) of the fluorine-containing copolymer was 0.2 wt %, to give the water and oil resistant composition.

The paper prepared above was dipped in the water and oil resistant composition for 5 minutes and dried at 115° C. for 70

TABLE 2

(Evaluation results in the Internal application process)

| | | Example 1 | Example 2 | Example 3 | Comparative Example 1 | Comparative Example 2 | Comparative Example 3 | Comparative Example 4 |
|---|---|---|---|---|---|---|---|---|
| Fluorine-containing Copolymer (Solution No.) | | S1 | S2 | S3 | RS1 | RS2 | RS3 | RS4 |
| Monomer composition pbw[1] | C8FA | — | — | — | — | 77 | — | — |
| | C6FA | 72 | 72 | 72 | 72 | — | 72 | 72 |
| | NVP | 8 | 8 | 8 | — | 8 | 8 | 8 |
| | AE-200 | — | — | 2 | 8 | — | — | — |
| | HEMA | 15 | 15 | 10 | 15 | 5 | 10 | — |
| | AA | 5 | 5 | 8 | 5 | — | — | 8 |
| | DMAEMA | — | — | — | — | 10 | 10 | 12 |
| Chain transfer agent (L-SH) (pbw)[1] | | — | 0.03 | — | — | — | — | — |
| Oil resistance: AGR value (%) | | 0 | 0 | 0 | 20 | 60 | 90 | 90 |
| Oil resistance: RP-2 (%) | | 0 | 0 | 0 | 10 | 24 | 32 | 46 |
| Oil resistance: Kit value | | 7 | 7 | 7 | 7 | 27 | 7 | 7 |
| Water resistance: Cobb value (g/m²) | | 25 | 24 | 24 | 25 | 27 | 26 | 28 |
| Dispersion stability | | Good | Good | Good | Good | Fair | Fair | Poor |

[1]pbw: parts by weight

From the results of Table 2, it is understood that the oil resistance, the water resistance and the dispersion stability of Examples 1 to 3 are all good, whereas in Comparative Example 1, the oil resistance (AGR and RP-2) is poor, and in the Comparative Examples 2 to 4, the oil resistance (AGR and RP-2) and dispersion stability are poor.

Example 4

Evaluation in the Surface Application Process

"Preparation of a Paper to be Tested"

A paper to be tested was produced by using a test paper machine installed in the Western Michigan University in seconds to obtain a raw paper for test. The evaluation results of the water resistance and the oil resistance obtained are shown in Table 3.

Examples 5 and 6

Evaluation in the Surface Application Process

Using, as the water and oil resistant agent, the aqueous dispersion solutions (SD2 and SD3) containing the fluorine-containing copolymer obtained in Preparation Examples 2 and 3, the water and oil resistant compositions were obtained by diluting the aqueous dispersion solutions (SD2 and SD3) to adjust the solid content to 0.2 wt %. Using each composition, the water resistance and the oil resistance were evaluated in the same way as in Example 4. The obtained results are shown in Table 3.

Comparative Examples 5-8

Evaluation in the Surface Application Process

Using, as the water and oil resistant agent, the aqueous dispersion solutions (RD1-RD4) containing the fluorine-containing copolymer obtained in Comparative Preparation Examples 1-4, the water and oil resistant compositions were obtained by diluting the aqueous dispersion solutions (RD1-RD4) to adjust the solid content to 0.2 wt %. Using each composition, the water resistance and the oil resistance were evaluated in the same way as Example 4. The obtained results are shown in Table 3.

TABLE 3

(Evaluation results in the Surface application process)

| | | Example 4 | Example 5 | Example 6 | Comparative Example 5 | Comparative Example 6 | Comparative Example 7 | Comparative Example 8 |
|---|---|---|---|---|---|---|---|---|
| Fluorine-containing copolymer (Solution No.) | | S1 | S2 | S3 | RS1 | RS2 | RS3 | RS4 |
| Monomer composition pbw[1)] | C8FA | — | — | — | — | 77 | — | — |
| | C6FA | 72 | 72 | 72 | 72 | — | 72 | 72 |
| | NVP | 8 | 8 | 8 | — | 8 | 8 | 8 |
| | AE-200 | — | — | 2 | 8 | — | — | — |
| | HEMA | 15 | 15 | 10 | 15 | 5 | 10 | — |
| | AA | 5 | 5 | 8 | 5 | — | — | 8 |
| | DMAEMA | — | — | — | — | 10 | 10 | 12 |
| Chain transfer agent (L-SH) (pbw)[1)] | | — | 0.03 | — | — | — | — | — |
| Oil resistance: AGR value (%) | | 0 | 0 | 0 | 18 | 36 | 76 | 80 |
| Oil resistance: RP-2 (%) | | 0 | 0 | 0 | 5 | 16 | 24 | 25 |
| Oil resistance: Kit value | | 8 | 8 | 8 | 8 | 9 | 8 | 7 |
| Water resistance: Cobb value (g/m$^2$) | | 18 | 17 | 19 | 17 | 16 | 17 | 20 |
| Dispersion stability | | Good | Good | Good | Good | Fair | Fair | Poor |

[1)]pbw: parts by weight

From the results of Table 3, it is understood that the oil resistance, the water resistance and the dispersion stability of Examples 4-6 are all good, whereas in Comparative Example 5, the oil resistance (AGR value and RP-2 value) is poor, and in the Comparative Examples 6-8, the oil resistance (AGR value and RP-2 value) and dispersion stability are poor.

INDUSTRIAL APPLICABILITY

The present invention comprises the environmentally-benign fluorine-containing copolymer having a $C_1$-$C_6$ fluoroalkyl group, and it can be utilized for the water and oil resistant agent for paper pertaining the superior water and oil resistance to paper. The present invention can be also utilized for the treatment process by the agent and the treated paper therewith.

The invention claimed is:
1. A water and oil resistant agent for paper comprising a fluorine-containing copolymer comprising, as essential components, the repeating units derived from:
(a) a fluorine-containing monomer having a fluoroalkyl group represented by the general formula:

$$CH_2=C(-X)-C(=O)-Y-Z-Rf \quad (1)$$

wherein X represents a hydrogen atom, a linear or branched $C_1$ to $C_{21}$ alkyl group, a fluorine atom, a chlorine atom, a bromine atom, an iodine atom, a $CFX^1X^2$ group wherein $X^1$ and $X^2$ are a hydrogen atom, a fluorine atom, a chlorine atom, a bromine atom or an iodine atom, a cyano group, a linear or branched $C_1$ to $C_{21}$ fluoroalkyl group, a substituted or non-substituted benzyl group, or a substituted or non-substituted phenyl group;
Y is —O— or —NH—;
Z is a $C_1$ to $C_{10}$ aliphatic group, a $C_6$ to $C_{10}$ aromatic or cyclic aliphatic group,
a —$CH_2CH_2N(R^1)SO_2$— group wherein $R^1$ is a $C_1$ to $C_4$ alkyl group,
a —$CH_2CH(OZ^1)CH_2$— group wherein $Z^1$ is a hydrogen atom or an acetyl group,
a —$(CH_2)_m$—$SO_2$—$(CH_2)_n$— group or a —$(CH_2)_m$—S—$(CH_2)_n$— group wherein m is an integer from 1 to 10 and n is an integer from 0 to 10, and
Rf is a linear or branched $C_1$ to $C_6$ fluoroalkyl group,
(b) a vinylpyrrolidone monomer represented by the general formula:

$$\begin{array}{c} R^{23} \quad R^{21} \\ R^{24} \diagdown \diagup R^{22} \\ R^{25} \diagup \diagdown \\ R^{26} \diagdown_N \diagup =O \\ | \\ HC=CH_2 \end{array} \quad (2)$$

wherein $R^{21}$, $R^{22}$, $R^{23}$, $R^{24}$, $R^{25}$ and $R^{26}$ are the same or different, and represent a hydrogen atom or a $C_1$ to $C_4$ alkyl group,
(c) a monomer having an anion-donating group, and
(d) a fluorine-free (meth)acrylate monomer,
wherein the fluorine-free (meth)acrylate monomer (d) is at least one selected from the group consisting of oxyalkylene (meth)acrylate of the general formula:

$$CH_2=CX^1C(=O)-O-(RO)_n-X^2 \quad (2a)$$

wherein $X^1$ is a hydrogen atom or a methyl group,
$X^2$ is a hydrogen atom or a saturated or unsaturated $C_1$ to $C_{22}$ hydrocarbon group,
R is a $C_2$ to $C_6$ alkylene group, and
n is an integer from 1 to 90, and a (meth)acrylate ester having an alkyl group of the general formula:

$$CH_2=CA^1COOA^2$$

wherein $A^1$ is a hydrogen atom or a methyl group, and $A^2$ is an alkyl group represented by $C_nH_{2n+1}$ in which n is 1 to 30.

2. The water and oil resistant agent for paper claimed in claim 1, wherein the fluoroalkyl group (Rf group) in the monomer (a) is a perfluoroalkyl group.

3. The water and oil resistant agent for paper claimed in claim 1, wherein the fluoroalkyl group (Rf group) in the monomer (a) is a $C_4$ to $C_6$ perfluoroalkyl group.

4. The water and oil resistant agent for paper claimed in claim 1, wherein the monomer (b) is at least one selected from the group consisting of N-vinyl-2-pyrrolidone, N-vinyl-3-methyl-2-pyrrolidone, N-vinyl-4-methyl-2-pyrrolidone, N-vinyl-5-methyl-2-pyrrolidone and N-vinyl-3,3-dimethyl-2-pyrrolidone.

5. The water and oil resistant agent for paper claimed in claim 1, wherein the monomer (c) is a compound having an anion-donating group and a carbon-carbon double bond.

6. The water and oil resistant agent for paper claimed in claim 1, wherein the anion-donating group is a carboxylic acid group or a sulfonic acid group.

7. The water and oil resistant agent for paper claimed in claim 1, wherein the monomer (c) is at least one selected from the group consisting of (meth)acrylic acid, crotonic acid, maleic acid, fumaric acid, itaconic acid, citraconic acid, vinylsulfonic acid, (meth)allylsulfonic acid, styrene sulfonic acid, vinylbenzene sulfonic acid, acrylamide-tert-butylsulfonic acid, and salts thereof.

8. The water and oil resistant agent for paper claimed in claim 1, wherein the fluorine-free (meth)acrylate monomer (d) is one or a mixture of 2-hydroxyethyl methacrylate and w-hydroxy-polyoxyethylene acrylate wherein an average polymerization degree (n) of the polyoxyethylene group is 2 to 10.

9. The water and oil resistant agent for paper claimed in claim 1, wherein the weight ratios among the monomers (a), (b), (c) and (d) in the fluorine-containing copolymer are (a):(b):(c):(d)=40-90:1-30:1-30:1-40.

10. The water and oil resistant agent for paper claimed in claim 1, wherein
the monomer (a) is at least one fluorine-containing monomer wherein Rf in the general formula (I) represents a $C_4$ to $C_6$ perfluoroalkyl group,
the monomer (b) is at least one selected from the group consisting of N-vinyl-2-pyrrolidone, N-vinyl-3-methyl-2-pyrrolidone, N-vinyl-4-methyl-2-pyrrolidone, N-vinyl-5-methyl-2-pyrrolidone and N-vinyl-3,3-dimethyl-2-pyrrolidone,
the monomer (c) is at least one selected from the group consisting of (meth)acrylic acid, crotonic acid, maleic acid, fumaric acid, itaconic acid and citraconic acid, and
the monomer (d) is at least one selected from the group consisting of 2-hydroxyethyl methacrylate, ω-hydroxy-polyoxyethylene acrylate wherein an average polymerization degree (n) of the polyoxyethylene group is 2 to 10, 2-hydroxypropyl (meth)acrylate, 4-hydroxybutyl (meth)acrylate, methyl (meth)acrylate, n-butyl (meth)acrylate and t-butyl (meth)acrylate.

11. The water and oil resistant agent for paper claimed in claim 1, wherein
the monomer (a) is $F(CF_2)_4CH_2CH_2OCOCH=CH_2$, $F(CF_2)_6CH_2CH_2OCOCH=CH_2$ or a mixture thereof,
the monomer (b) is N-vinyl-2-pyrrolidone,
the monomer (c) is methacrylic acid or acrylic acid, and
the monomer (d) is either of 2-hydroxyethyl (meth)acrylate or ω-hydroxy-polyoxyethylene acrylate wherein an average polymerization degree (n) of the polyoxyethylene group is 2 to 10 or a mixture thereof.

12. A process for treating paper to be water and oil-resistant, wherein the process comprises a step of applying the water and oil resistant agent for paper claimed in claim 1 to the whole paper including internal parts of paper.

13. The process claimed in claim 12, wherein the step of applying the water and oil resistant agent for paper to the whole paper is a step of applying the water and oil resistant agent to a pulp at a papermaking stage.

14. The process claimed in claim 13, wherein the water and oil resistant agent for paper is used in an amount that a weight ratio of the fluorine atoms is 0.01 to 1.0% by weight based on the weight of the pulp.

15. A process for treating paper to be water and oil-resistant, wherein the process comprises a step of applying the water and oil resistant agent for paper claimed in claim 1 to the surface of the paper.

16. The process claimed in claim 15, wherein the water and oil resistant agent for paper is used in an amount that a weight ratio of the fluorine atoms is 0.005 to 0.6% by weight based on the weight of the paper.

17. A paper treated with a water and oil resistant agent for paper comprising a fluorine-containing copolymer comprising, as essential components, the repeating units derived from:
(a) a fluorine-containing monomer having a fluoroalkyl group represented by the general formula:

$$CH_2=C(-X)-C(=O)-Y-Z-Rf \quad (1)$$

wherein X represents a hydrogen atom, a linear or branched $C_1$ to $C_{21}$ alkyl group, a fluorine atom, a chlorine atom, a bromine atom, an iodine atom, a $CFX^1X^2$ group wherein $X^1$ and $X^2$ are a hydrogen atom, a fluorine atom, a chlorine atom, a bromine atom or an iodine atom, a cyano group, a linear or branched $C_1$ to $C_{21}$ fluoroalkyl group, a substituted or non-substituted benzyl group, or a substituted or non-substituted phenyl group;
Y is —O— or —NH—;
Z is a $C_1$ to $C_{10}$ aliphatic group, a $C_6$ to $C_{10}$ aromatic or cyclic aliphatic group,
a —$CH_2CH_2N(R^1)SO_2$— group wherein $R^1$ is a $C_1$ to $C_4$ alkyl group,
a —$CH_2CH(OZ^1)CH_2$— group wherein $Z^1$ is a hydrogen atom or an acetyl group,
a —$(CH_2)_m$—$SO_2$—$(CH_2)_n$— group or a —$(CH_2)_m$—S—$(CH_2)_n$— group wherein m is an integer from 1 to 10 and n is an integer from 0 to 10, and
Rf is a linear or branched $C_1$ to $C_6$ fluoroalkyl group,
(b) a vinylpyrrolidone monomer represented by the general formula:

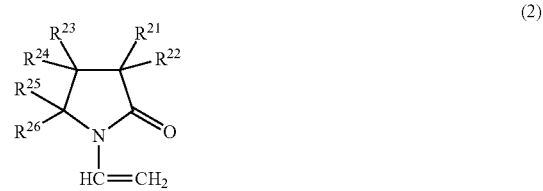

wherein $R^{21}$, $R^{22}$, $R^{23}$, $R^{24}$, $R^{25}$ and $R^{26}$ are the same or different, and represent a hydrogen atom or a $C_1$ to $C_4$ alkyl group, (c) a monomer having an anion-donating group, and (d) a fluorine-free (meth)acrylate monomer, wherein the fluorine-free (meth)acrylate monomer (d) is at least one selected from the group consisting of oxyalkylene (meth)acrylate of the general formula:

$$CH_2\text{=}CX^1C(\text{=}O)\text{—}O\text{—}(RO)_n\text{—}X^2 \quad (2a)$$

wherein $X^1$ is a hydrogen atom or a methyl group, $X^2$ is a hydrogen atom or a saturated or unsaturated $C_1$ to $C_{22}$ hydrocarbon group, R is a $C_2$ to $C_6$ alkylene group, and n is an integer from 1 to 90, and a (meth)acrylate ester having an alkyl group of the general formula:

$$CH_2\text{=}CA^1COOA^2$$

wherein $A^1$ is a hydrogen atom or a methyl group, and $A^2$ is an alkyl group represented by $C_nH_{2n+1}$ in which n is 1 to 30.

18. An internally treated paper obtained by the process claimed in claim 12.

19. An externally treated paper obtained by the process claimed in claim 15.

20. A composition for treating paper comprising a water and oil resistant agent for paper and an additive which is at least one selected from the group consisting of a sizing agent, a paper strengthening agent, a retention aid, a dyestuff, a fluorescent dyestuff, a filler, a slime-controlling agent, an anti-slipping agent and a deformer, wherein the water and oil resistant agent for paper comprises a fluorine-containing copolymer comprising, as essential components, the repeating units derived from:

(a) a fluorine-containing monomer having a fluoroalkyl group represented by the general formula:

$$CH_2\text{=}C(\text{—}X)\text{—}C(\text{=}O)\text{—}Y\text{—}Z\text{—}Rf \quad (1)$$

wherein X represents a hydrogen atom, a linear or branched $C_1$ to $C_{21}$ alkyl group, a fluorine atom, a chlorine atom, a bromine atom, an iodine atom, a $CFX^1X^2$ group wherein $X^1$ and $X^2$ are a hydrogen atom, a fluorine atom, a chlorine atom, a bromine atom or an iodine atom, a cyano group, a linear or branched $C_1$ to $C_{21}$ fluoroalkyl group, a substituted or non-substituted benzyl group, or a substituted or non-substituted phenyl group;

Y is —O— or —NH—;

Z is a $C_1$ to $C_{10}$ aliphatic group, a $C_6$ to $C_{10}$ aromatic or cyclic aliphatic group, a —$CH_2CH_2N(R^1)SO_2$— group wherein $R^1$ is a $C_1$ to $C_4$ alkyl group, a —$CH_2CH(OZ^1)$ $CH_2$— group wherein $Z^1$ is a hydrogen atom or an acetyl group, a —$(CH_2)_m$—$SO_2$—$(CH_2)_n$— group or a —$(CH_2)_m$—S—$(CH_2)_n$— group wherein m is an integer from 1 to 10 and n is an integer from 0 to 10, and Rf is a linear or branched $C_1$ to $C_6$ fluoroalkyl group, (b) a vinylpyrrolidone monomer represented by the general formula:

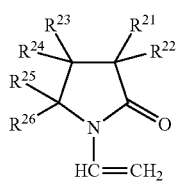

(2)

wherein $R^{21}$, $R^{22}$, $R^{23}$, $R^{24}$, $R^{25}$ and $R^{26}$ are the same or different, and represent a hydrogen atom or a $C_1$ to $C_4$ alkyl group, (c) a monomer having an anion-donating group, and (d) a fluorine-free (meth)acrylate monomer, wherein the fluorine-free (meth)acrylate monomer (d) is at least one selected from the group consisting of oxyalkylene (meth)acrylate of the general formula:

$$CH_2\text{=}CX^1C(\text{=}O)\text{—}O\text{—}(RO)_n\text{—}X^2 \quad (2a)$$

wherein $X^1$ is a hydrogen atom or a methyl group, $X^2$ is a hydrogen atom or a saturated or unsaturated $C_1$ to $C_{22}$ hydrocarbon group, R is a $C_2$ to $C_6$ alkylene group, and n is an integer from 1 to 90, and a (meth)acrylate ester having an alkyl group of the general formula:

$$CH_2\text{=}CA^1COOA^2$$

wherein $A^1$ is a hydrogen atom or a methyl group, and $A^2$ is an alkyl group represented by $C_nH_{2n+1}$ in which n is 1 to 30.

* * * * *